US 8,645,138 B1

(12) United States Patent
Weinstein et al.

(10) Patent No.: US 8,645,138 B1
(45) Date of Patent: Feb. 4, 2014

(54) TWO-PASS DECODING FOR SPEECH RECOGNITION OF SEARCH AND ACTION REQUESTS

(71) Applicant: Google Inc., Mountain View, CA (US)

(72) Inventors: Eugene Weinstein, New York City, NY (US); Austin Waters, Austin, TX (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/723,191

(22) Filed: Dec. 20, 2012

(51) Int. Cl.
*G10L 15/00* (2013.01)
*G10L 21/00* (2013.01)

(52) U.S. Cl.
USPC ........... 704/251; 704/231; 704/244; 704/270; 704/270.1; 704/275

(58) Field of Classification Search
USPC ............................. 704/251, 270, 270.1, 275
See application file for complete search history.

(56) References Cited

U.S. PATENT DOCUMENTS

| | | | |
|---|---|---|---|
| 4,520,576 A * | 6/1985 | Vander Molen | 34/534 |
| 6,615,172 B1 | 9/2003 | Bennett et al. | |
| 6,885,990 B1 | 4/2005 | Ohmori et al. | |
| 6,961,701 B2 * | 11/2005 | Ogawa et al. | 704/236 |
| 7,058,573 B1 * | 6/2006 | Murveit et al. | 704/229 |
| 7,174,298 B2 | 2/2007 | Sharma | |
| 7,203,651 B2 * | 4/2007 | Baruch et al. | 704/270.1 |
| 7,206,747 B1 * | 4/2007 | Morgan et al. | 704/275 |
| 7,454,342 B2 | 11/2008 | Nefian et al. | |
| 7,496,500 B2 * | 2/2009 | Reed et al. | 704/9 |
| 7,660,713 B2 | 2/2010 | Surendran et al. | |
| 8,229,748 B2 * | 7/2012 | Chang et al. | 704/260 |
| 8,515,745 B1 * | 8/2013 | Garrett et al. | 704/231 |
| 2002/0091518 A1 * | 7/2002 | Baruch et al. | 704/231 |
| 2004/0059575 A1 * | 3/2004 | Brookes et al. | 704/254 |
| 2004/0158468 A1 * | 8/2004 | Baker | 704/238 |
| 2005/0080632 A1 * | 4/2005 | Endo et al. | 704/277 |

(Continued)

FOREIGN PATENT DOCUMENTS

| | | |
|---|---|---|
| EP | 1981256 | 10/2008 |
| WO | 2009/020272 | 2/2009 |

OTHER PUBLICATIONS

R. Berwick, "An Idiot's Guide to Support Vector Machines (SVMs)", 2003, Massachusetts Institute of Technology, Cambridge, MA.

(Continued)

*Primary Examiner* — Pierre-Louis Desir
*Assistant Examiner* — Abdelali Serrou
(74) *Attorney, Agent, or Firm* — McDonnell Boehnen Hulbert & Berghoff LLP

(57) ABSTRACT

Disclosed are apparatus and methods for processing spoken speech. Input speech can be received at a computing system. During a first pass of speech recognition, a plurality of language model outputs can be determined by: providing the input speech to each of a plurality of language models and responsively receiving a language model output from each language model. A language model of the plurality of language models can be selected using a classifier operating on the plurality of language model outputs. During a second pass of speech recognition, a revised language model output can be determined by: providing the input speech and the language model output from the selected language model to the selected language model and responsively receiving the revised language model output from the selected language model. The computing system can generate a result based on the revised language model output.

20 Claims, 6 Drawing Sheets

(56) References Cited

U.S. PATENT DOCUMENTS

| | | | |
|---|---|---|---|
| 2006/0136207 A1* | 6/2006 | Kim et al. | 704/249 |
| 2006/0178879 A1* | 8/2006 | Murveit et al. | 704/231 |
| 2006/0184360 A1* | 8/2006 | Murveit et al. | 704/231 |
| 2007/0033054 A1* | 2/2007 | Snitkovskiy et al. | 704/275 |
| 2008/0059178 A1 | 3/2008 | Yamamoto et al. | |
| 2009/0171662 A1* | 7/2009 | Huang et al. | 704/251 |
| 2009/0240499 A1 | 9/2009 | Dvir et al. | |
| 2010/0312557 A1* | 12/2010 | Strom et al. | 704/246 |
| 2011/0099157 A1* | 4/2011 | LeBeau et al. | 707/706 |
| 2011/0106534 A1* | 5/2011 | LeBeau et al. | 704/235 |
| 2011/0144996 A1* | 6/2011 | Ma et al. | 704/251 |
| 2011/0213613 A1* | 9/2011 | Cohen et al. | 704/235 |
| 2011/0313764 A1* | 12/2011 | Bacchiani et al. | 704/235 |
| 2012/0046947 A1* | 2/2012 | Fleizach | 704/260 |
| 2012/0245940 A1* | 9/2012 | Willett et al. | 704/244 |
| 2012/0259636 A1* | 10/2012 | Sejnoha et al. | 704/235 |
| 2013/0006640 A1* | 1/2013 | Cohen et al. | 704/257 |
| 2013/0080167 A1* | 3/2013 | Mozer | 704/246 |
| 2013/0080171 A1* | 3/2013 | Mozer et al. | 704/251 |

OTHER PUBLICATIONS

M. T. Brannic, "Logistic Regression", Jun. 29, 2007, College of Arts & Sciences, University of South Florida, Tampa, FL.

M. Mohri, "Speech Recognition—Lecture 12: Lattice Algorithms", Nov. 25, 2012, Courant Institute of Mathematical Sciences, New York University, New York City, NY.

J. J. Odell, "The Use of Context in Large Vocabulary Speech Recognition", Mar. 1995, Ph.D. Thesis, Queen's College, University of Cambridge, Cambridge, UK.

D. Povey et al.,"Generating Exact Lattices in the WFST Framework", Proceedings of the IEEE International Conference on Acoustics, Speech, and Signal Processing (ICASSP) 2012, Mar. 25-30, 2012, pp. 4213-4216, IEEE, Kyoto, Japan.

Wikipedia, "Logistic Regression", Oct. 15, 2012 (last modified), Wikimedia Foundation, Inc.

* cited by examiner

US 8,645,138 B1

TWO-PASS DECODING FOR SPEECH RECOGNITION OF SEARCH AND ACTION REQUESTS

BACKGROUND

Unless otherwise indicated herein, the materials described in this section are not prior art to the claims in this application and are not admitted to be prior art by inclusion in this section.

Recently, interest has been shown in use of voice interfaces for computing devices. In particular, voice interfaces are becoming more common for devices often used in "eyes-busy" and/or "hands-busy" environments, such as smart phones or devices associated with vehicles. In many scenarios, devices in eyes-busy and/or hands-busy environments are asked to perform repetitive tasks, such as, but not limited to, searching the Internet, looking up addresses, and purchasing goods or services.

SUMMARY

In one aspect, a method is provided. Input speech is received at a computing system. During a first pass of speech recognition, a plurality of language model outputs is determined by: providing the input speech as an input to each of a plurality of language models and receiving a language model output from each language model. A selected language model of the plurality of language models is determined using a classifier operating on the plurality of language model outputs. During a second pass of speech recognition, a revised language model output is determined by: providing the input speech and the language model output from the selected language model as inputs to the selected language model and receiving the revised language model output from the selected language model. The computing system generates a result based on the revised language model output.

In another aspect, a computing system is provided. The computing system includes a processor and a computer-readable storage medium having stored thereon program instructions that, upon execution by the processor, cause the computing system to perform operations. The operations include: receiving input speech, providing the input speech as an input to each of a plurality of language models, receiving a language model output from each language model, determining a selected language model of the plurality of language models based on a classifier operating on the plurality of language model outputs, providing the input speech and the language model output from the selected language model as inputs to the selected language model, receiving a revised language model output from the selected language model, and generating a result based on the revised language model output.

In yet another aspect, a computer-readable storage medium is provided. The computer-readable storage medium has stored thereon program instructions that, upon execution by a computing system, cause the computing system to perform operations. The operations include: providing input speech as an input to each of a plurality of language models, receiving a language model output from each language model, determining a selected language model of the plurality of language models based on a classifier operating on the plurality of language model outputs, providing the input speech and the language model output from the selected language model as inputs to the selected language model, receiving a revised language model output from the selected language model, and generating an result based on the revised language model output.

DETAILED DESCRIPTION

Overview

Figure 1:
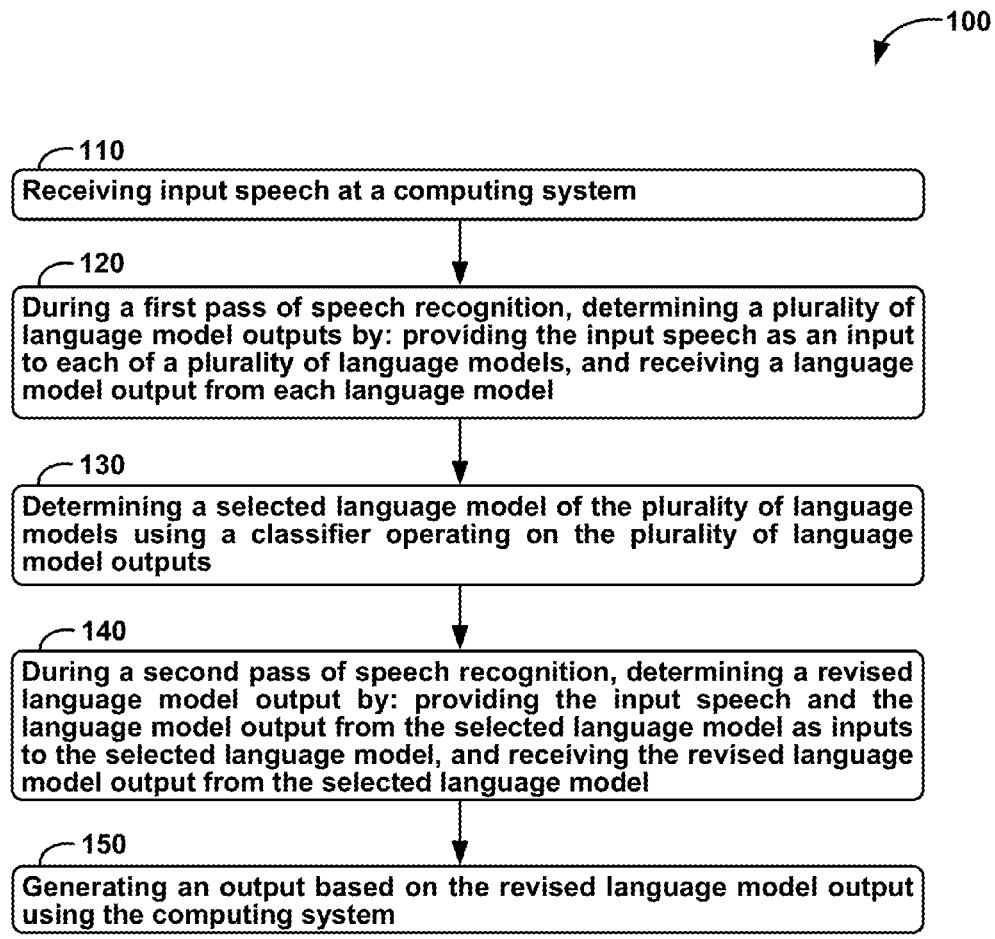
FIG. 1 is a flow chart of a method, in accordance with an example embodiment.

Voice search systems have become applications of speech recognition technology. Speech recognition can be used on mobile devices to do more than recognize search queries. For example, voice search systems have been programmed to understand "actions" or, command-and-control inputs, such as "set alarm for 6:30" or "send an SMS to Mike that I'm running 10 minutes late".

Modern speech recognizers model the word sequences expected to be spoken to the system through a statistical algorithm known as a language model. Such a model generally gives a match probability for any sequence of words in the vocabulary of the speech recognizers according to the statistics of the training data. For a voice-driven search engine, the training data can be based on search queries typed into a search engine. Using this training data, the word sequence "pictures of Taj Mahal" can be assigned a high probability as likely for typed search query, whereas "Taj pictures of Mahal" can be assigned a low probability since this sequence of words is unlikely to be typed as a search query and presented to the search engine.

Hybrid speech recognition systems can recognize multiple types of spoken inputs. For example, a hybrid speech recognition system can be used to recognize both search queries and "action commands", or command to a mobile or other device. In other examples, more than two types of spoken inputs can be recognized by the hybrid speech recognition system; e.g., inputs in different languages, multiple sets of action commands, various classes of search queries, conversational speech, and other types of spoken inputs.

Hybrid speech recognition systems can utilize language model(s) that can robustly recognize input of both types and also decide correctly whether to label an input as a query or a command. However, constructing such language model(s) can be difficult due to finding good statistics for some or all types of spoken inputs. For example, even with access to a large number of typed search queries, it can be difficult to generate good statistics for action commands, as very few action commands, such "set alarm for 6:30", are typed into a search engine. Hence, a hybrid speech recognition system recognizing both search queries and action commands with access to a large amount of search query data and little or no action command data may have to tie together a language model trained using the large amount of search query and a hand-crafted command/action recognition grammar with little or no usage data for the action commands.

One technique to tie together by search queries and action commands can include assigning a probability to each type of input. The speech recognizer can then attempt to simultaneously map the spoken query to both the language model and the action grammar and picks the match that has the best score when weighted by these input-type probabilities.

However, the input-type probability setting process can lead to additional problems. Setting too high of a probability on input speech being a search query can lead to rarely, if ever, recognizing action commands. Setting too low of a probability on input speech being a search query can lead to falsely triggering action commands instead of search queries. This can degrade the experience of using a speech interface. Certain highly confusable query/action pairs can make setting input-type probabilities difficult, for example distinguishing "call of helix" (a game), might trigger an action grammar looking for action commands that begin with the word "call" ("call John mobile", for instance). If the user has a contact such as "Felix" that sounds similar to "of helix", the speech recognition process can easily confuse the "call of helix" search query for the video game with the action command "call Felix" to make a phone call.

Another technique for hybrid speech recognition systems can involve a two-pass speech recognition system. In the two-pass speech recognition system, a first "coarse" recognition pass is made to narrow down the hypothesis space. Each candidate input type can be modeled using a respective language model and each language model can be executed during the first pass. For example, in a hybrid speech recognition system for action commands and search queries, an Action Language Model (Action LM) can be used to recognize the action commands and a Query Language Model (Query LM) can be used to recognize the search queries.

The input speech can be provided separately to each language model; e.g., both the Action LM and the Query LM, to generate a set of most likely hypotheses for the input speech with respect to that language model.

The hypotheses matched to the input speech by the first pass can be represented by an output list of n best hypotheses; e.g., one output list of most likely hypotheses for the Action LM and a separate output list of most likely hypotheses for the Query LM.

After the first pass, assuming two (or more) language models are available for later processing, a classifier can be used to make a classification decision; e.g., is the input speech a search query or action command? Example statistical classifiers can include a support vector machine (SVM) or a logistic regression function.

The classifier can output a classification decision and a confidence value for the classification decision. In some embodiments, the confidence value can be compared to a minimum confidence value threshold. Then, the classification decision can be accepted if the confidence value exceeds the minimum confidence value threshold and the classification decision can be rejected if the confidence value does not exceed the minimum confidence value threshold.

For example, if the classification decision indicated that input speech is likely to be an action command, the Action LM can be considered as a selected language model. If the confidence level in selecting the Action LM exceeds the minimum confidence value threshold, then the Action LM can be used in the second pass.

After making the classification decision, the second "rescoring" or "refinement" pass can be executed. The lattice for the selected language model, prior probabilities from the hypotheses of the selected language model and/or the words of the hypotheses can be provided as input(s) to the second pass. The second pass can rescore or refine the prediction of the input speech using the selected language model solely.

In some examples, the second pass considers only the n best hypotheses matched in the first pass by the selected language model, but is free to reorder them by assigning new likelihoods, and possibly to select a new top recognition hypothesis. In the second pass, since the number of possible transcriptions of the audio is often smaller than that in the first pass, speech recognition can be performed with much larger and more accurate models that would be infeasible to use in the first pass.

The use of a two-pass technique permits application of hybrid models for speech recognition, such as using handcrafted grammars for small vocabularies, such as action words, in combination with automatically generated grammars, such as HMM-based speech recognition for larger vocabularies. Hybrid models can recognize multiple vocabularies that can potentially be present in one input speech stream and can use an appropriate recognition technique for each vocabulary. By making classification between grammars, and thus vocabularies, explicit using a binary classifier, this system can attempt to recognize input speech using two different language models during the first pass, perhaps in operating both language models in parallel. During the second pass, the system can attempt to improve the results of the most likely grammar determined by the classifier in the second pass, leading to more accurate speech recognition. In embodiments where an n-ary classifier is used (n>2), the system can attempt to recognize input speech using n different language models during the first pass.

Example Operations

FIG. 1 is a flow chart of method 100, in accordance with an example embodiment. Method 100 begins at block 110, where a computing system can receive input speech.

At block 120, a plurality of language model outputs can be determined during a first pass of speech recognition. During the first pass, the input speech can be provided as an input to each of a plurality of language models, and a language model output can be received from each language model.

In some embodiments, the plurality of language models can include a query language model and an action language model. The query language model can be configured to recognize search queries. The action language model can be configured to recognize action commands. The query language model can differ from the action language model.

At block 130, a selected language model of the plurality of language models can be determined using a classifier operating on the plurality of language model outputs. In some embodiments, the plurality of language model outputs can include a query lattice output from the query language model and an action lattice output from the action language model, such as discussed below in more detail with respect to at least FIG. 3. In other embodiments, the classifier can include a binary classifier configured to receive the language model outputs from both the action language model and the query language model and to select either the action language model or the query language model as the selected language model, such as discussed below in more detail with respect to at least FIG. 3.

In even other embodiments, the classifier can be configured to utilize a logistic regression function and/or a SVM to select the selected language model. The logistic regression function can be configured to model a probability that the plurality of language model outputs is related to the selected language model of the plurality of language models and to select the selected language model based on the modeled probability. The SVM can be configured to determine a plane or hyperplane related to the plurality of language model outputs and to select the selected language model based on the plane or hyperplane. Logistic regression functions and SVMs are discussed below in more detail with respect to at least FIG. 3.

At block 140, a revised language model output can be determined during a second pass of speech recognition. During the second pass: the input speech and the language model output from the selected language model can be provided as inputs to the selected language model and the revised language model output can be received from the selected language model.

In some embodiments, determining the revised language model output can include: (i) after selecting the action language model as the selected language model, providing the input speech and an action lattice to the action language model and responsively receiving a revised action lattice from the action language model and (ii) after selecting the query language model as the selected language model, providing the input speech and a query lattice to the query language model, and responsively receiving a revised query lattice from the query language model, such as discussed below in more detail with respect to at least FIG. 3.

At block 150, the computing system can generate a result based on the revised language model output. In some embodiments, generating the result can include: generating text corresponding to the input speech based on the revised language model output and generating spoken output corresponding to the input speech based on the text and/or the revised language model output.

In other embodiments, generating the result can include: (i) after selecting the action language model as the selected language model: generating an action command based on the revised language model output, and generating the result by providing the action command to an action engine that can execute the action command and (ii) after selecting the query language model as the selected language model: generating a search query based on the revised language model output, and generating the result by providing the search query to a search engine.

Example Scenarios for Utilizing Multiple Language Models

Figure 2A:
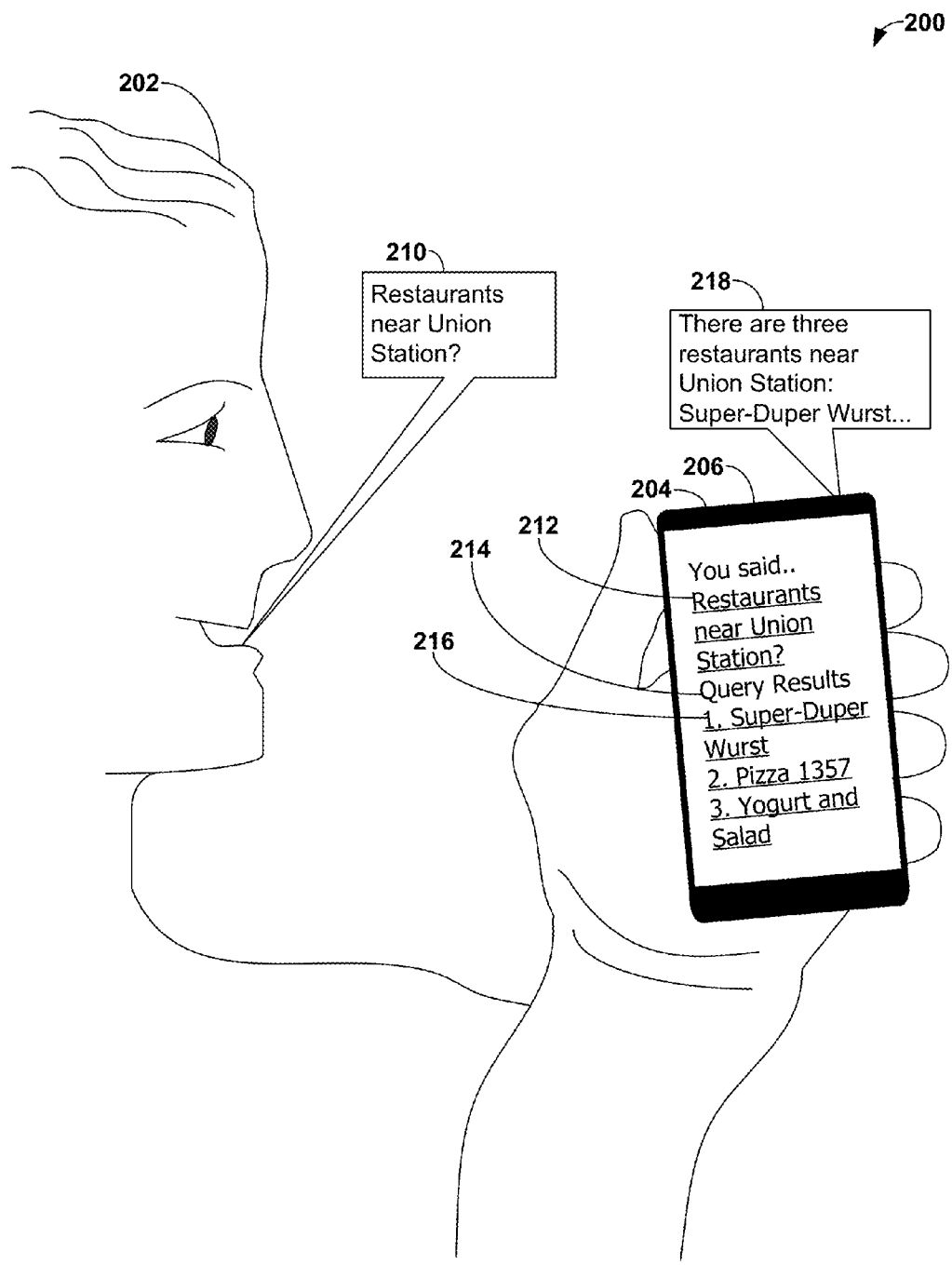
FIGS. 2A and 2B depict a scenario utilizing a voice interface for a mobile device, in accordance with an example embodiment.
Figure 2B:
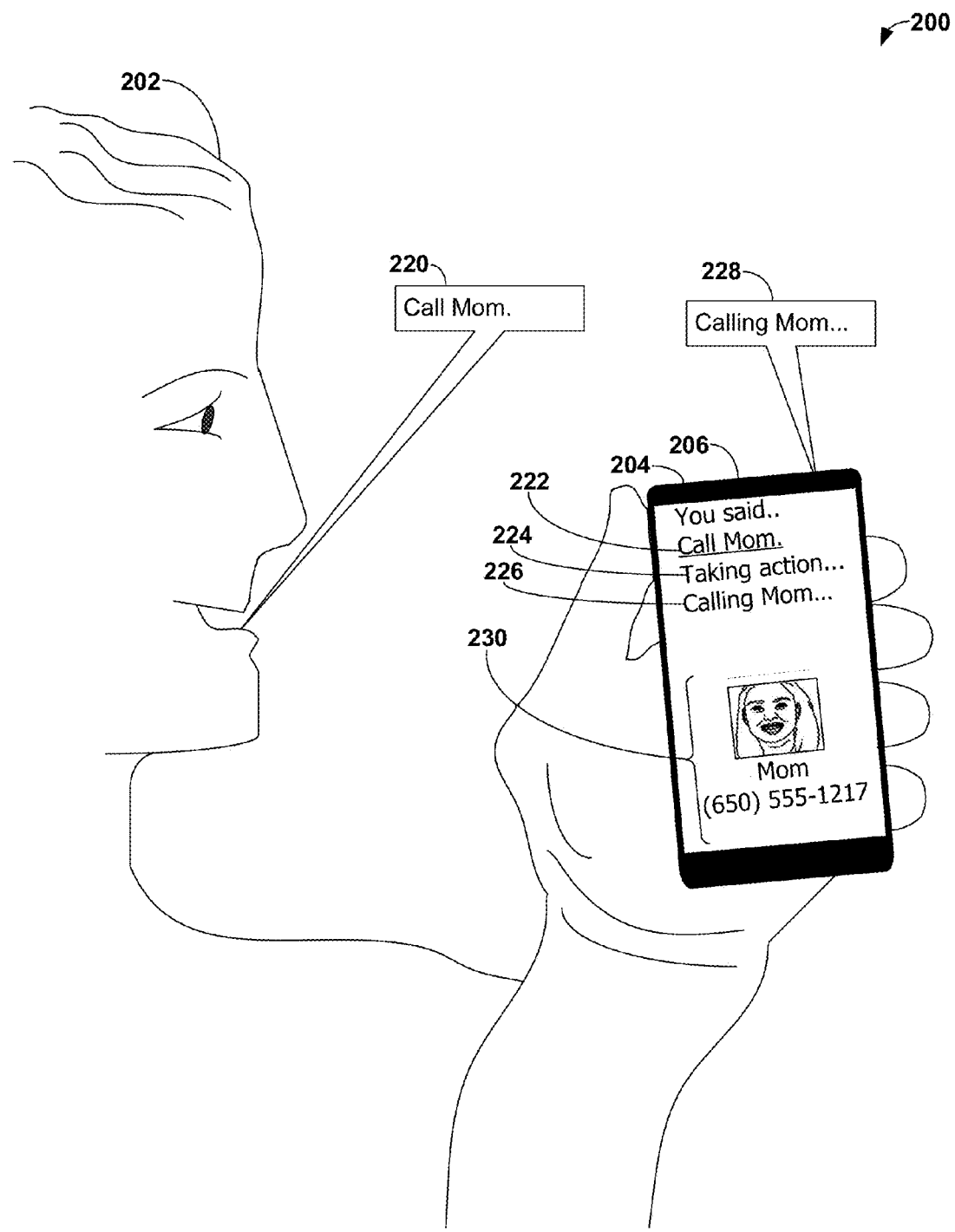

FIGS. 2A and 2B depict a scenario 200 of a speaker 202 utilizing a voice interface 206 for a mobile device 204, in accordance with an example embodiment. Voice interface 206 can recognize search queries and query-related words using a query language model (Query LM) and actions to be performed by mobile device 204 and action-related words using an action language model (Action LM). In scenario 200, the Action LM is distinct from the Query LM.

During scenario 200, speaker 202 provides input speech 210 of "Restaurants near Union Station" to mobile device 204. Voice interface 206 of mobile device 204 provides input speech 210 to the Query LM and the Action LM as part of a two-pass speech recognition process described below in more detail in the context of FIG. 3. Upon receiving input speech 210, mobile device 204 can display text 212 that echoes input speech 210 to verify to speaker 202 that input speech 210 was captured correctly. The two-pass speech recognition process uses a classifier to determine that input speech 210 is a search query. After determining that input speech 210 is a search query, voice interface 206 can use the Query LM to generate and refine a search query based on input speech 210.

After this refinement, mobile device 204 can request that a search engine perform a search using the generated search query. In scenario 200, mobile device 204 can receive search results corresponding to the generated search query, in response to requesting a search using the search query. FIG. 2 shows that, in response to receiving the search results, mobile device 204 can generate text 214 of "Query Results" to indicate a query was performed. Mobile device 204 can also display search results 216 related to three restaurants: (1) Super-Duper Wurst, (2) Pizza 1357, and (3) Yogurt and Salad. In scenario 200, in response to receiving the search results, voice interface 206 generates speech output 218 of "There are three restaurants near Union Station: Super-Duper Wurst...."

FIG. 2B shows scenario 200 continuing with speaker 202 providing input speech 220 of "Call Mom." to mobile device 204. Voice interface 206 of mobile device 204 provides input speech 220 to the Query LM and the Action LM as part of the two-pass speech recognition process. The classifier of the two-pass speech recognition process determines that input speech 220 is an action command to have mobile device 204 make a telephone call. After determining that input speech 220 is an action command, voice interface 206 can use the Action LM to generate and refine an action command based on input speech 220.

After this refinement, mobile device 204 can take the action specified in the refined action command. In some embodiments, mobile device 204 can take the action by use of an action engine that takes action commands as inputs and executes the action commands. In scenario 200, in response to the refined action command, mobile device 204 can take the requested action by:

look up "Mom" as a contact to determine a telephone number for Mom, determine that Mom's telephone number is (650) 555-1217, display text 224 of "Taking action..." to indicate that an action command was received and text 226 to indicate that the action command in input speech 220 involved "Calling Mom", use voice interface 206 to generate speech output 228 of "Calling Mom...", place a phone call to (650) 555-1217, and display Mom's contact information 230.

In some scenarios, text indicating a query or action is taken; e.g., text 214 and/or 224, may not be displayed by mobile device 204. In other scenarios, spoken output 218 and/or 228 may not be generated by voice interface 206 of mobile device 204. Many other queries and action commands can be utilized in still other scenarios.

Example Two-Pass Process for Speech Recognition

Figure 3:
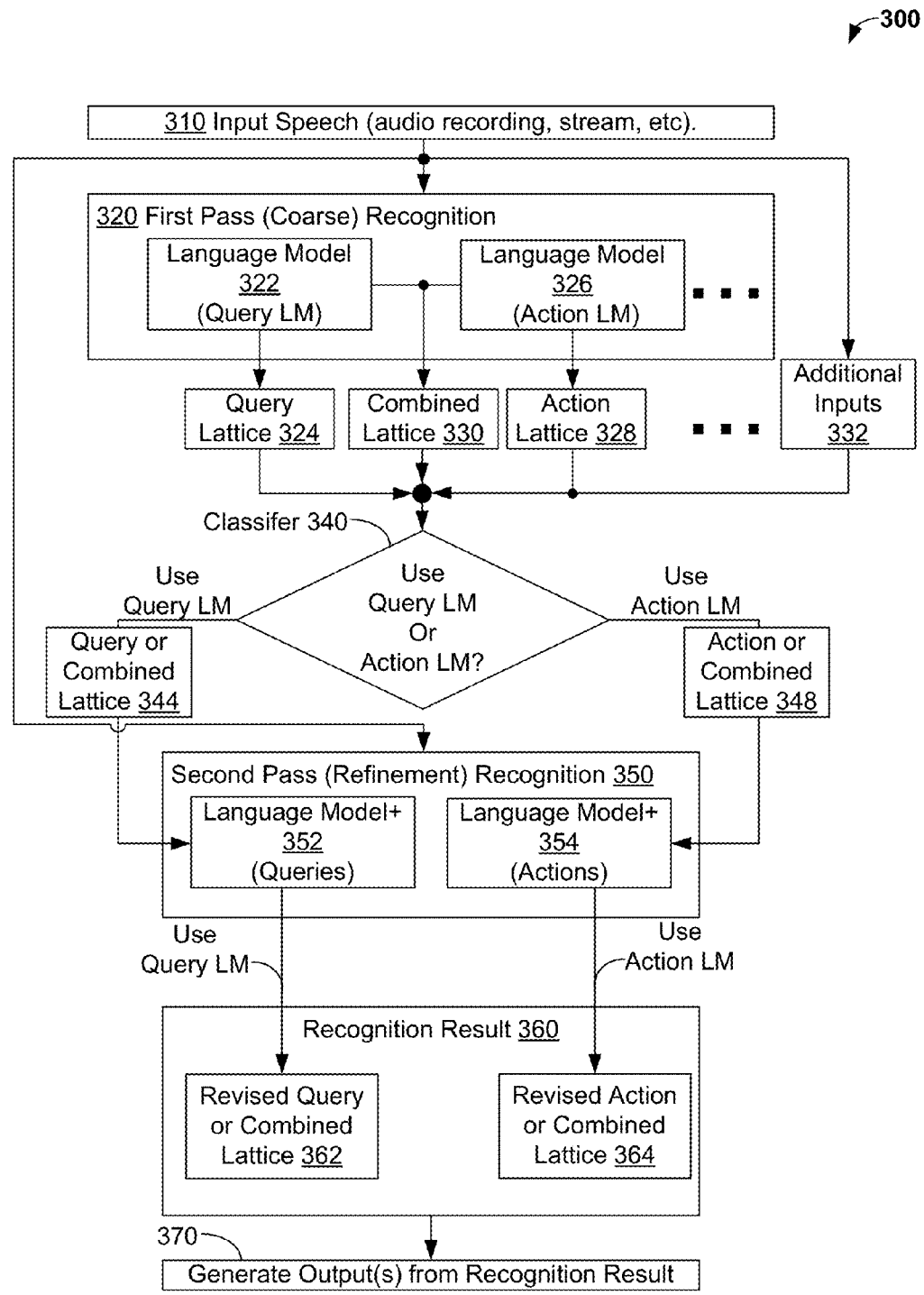
FIG. 3 depicts an example two-step process for voice recognition, in accordance with an example embodiment.

FIG. 3 is a flow chart of an example two-pass process 300 for speech recognition that can be performed using a computing system, such as computing system 400, or a computing device, such as computing device 500. The first pass of two-pass process 300 takes input speech as an input and uses multiple language models to determine multiple language model outputs. The multiple language model outputs are passed into a classifier function, which can select one language model as a selected language model. The second pass of two-pass process 300 involves using the selected language model, and perhaps related language models, to refine the selected output. The refined output can be used to generate outputs, such as, but not limited to, action commands, search queries, text corresponding to the input speech, spoken outputs, and displays related to the input speech.

The two-pass process for speech recognition begins at block 310 where input speech is received. The input speech can be a stream of audio data, live audio data being spoken by a speaker, recorded audio data, and/or other kinds of audio data; e.g., audio data provided as part of recorded video content.

The input speech is provided to first pass of "coarse" speech recognition 320. First pass 320 includes two language models: Query LM 322 and Action LM 326. In some embodiments, additional and/or different language models other than Query LM 322 and Action LM 326 can be used as part of first pass 320. During first pass 320, input speech from block 310 is provided as inputs to both Query LM 322 and Action LM 326, which in turn generate a list of hypotheses about text corresponding to the input speech. In some embodiments, Query LM 322 and Action LM 326 are executed in parallel during first pass 320.

In other embodiments, if the most likely hypothesis of a language model does not exceed a minimum-likelihood probability threshold, then that language model can be removed from all later processing. If two or more language models met the minimum-likelihood probability threshold; e.g., both Query LM 322 and Action LM 326 met the minimum-likelihood probability threshold, then the language models can be classified as discussed below with regard to classifier 340. If only one language model met the minimum-likelihood probability threshold, e.g., only Query LM 322 (or Action LM 326) met the minimum-likelihood probability threshold, then, in some embodiments, second pass 350 can be performed using the language model that met the minimum-likelihood probability threshold, perhaps without utilizing classifier 340. If each of the most likely hypotheses for all language models fail to exceed the minimum-likelihood probability threshold; e.g., both Query LM 322 and Action LM 326 fail to meet the minimum-likelihood probability threshold, then the minimum-likelihood probability threshold test can be partially or completely ignored; e.g., Query LM 322 and/or Action LM 326 that were previously removed from use in second pass 350 can be restored for classification by classifier 340.

The hypotheses matched to the input speech by the first pass can be represented by an output list of n best hypotheses; e.g., one output list of most likely hypotheses for Query LM 322 and a separate output list of most likely hypotheses for Action LM 326. In some embodiments, each list of most likely hypotheses can be represented using weighted graph known as a lattice, such as query lattice 324 output from Query LM 322 and action lattice 328 output from Action LM 326 as shown in FIG. 3.

In some embodiments, a combined lattice, such as combined lattice 330 shown in FIG. 3, can be an output of first pass 320. For example, each language model can be run separately and concurrently; e.g., language model 322 can be run in one thread while language model 326 is running in another thread. Outputs of the language models can be combined; for example, by interpolating the outputs. The interpolation of outputs can be performed using a linear combination. For example, let w be a given hypothesis, let P(w|Query LM) be a probability of w determined by an output of language model 322, let P(w|Action LM) be a probability of w determined by an output of language model 326, and let alpha ($\alpha$) be a predetermined interpolation weight selected from the range [0,1]. Further, let P(w|combined model) be probability of w determined by an output of the combined query and action language models, where P(w|combined model)=$\alpha$*P(w|Query LM)+(1−$\alpha$)*P(w|Action LM).

In systems using interpolation of outputs, there can be a single output lattice from the combined first-pass recognition. That is, the output of first pass 320 can be either (a) both query lattice 324 and action lattice 328 or (b) combined lattice 330.

In some embodiments, additional inputs 332 can be provided to classifier 340 as well. For example, acoustic features of input speech 310 can be provided as additional inputs 332. Other additional inputs 332 are possible as well.

FIG. 3 shows that query lattice 324, action lattice 328, combined lattice 330, and/or additional inputs 332 can be input to classifier 340 which makes a classification decision of "Use Query LM or Action LM" based on these inputs. Classifier 340 can be a statistical classifier, such as, but not limited to, a SVM and/or a logistic regression function.

A binary SVM can attempt to find a plane or hyperplane that separates data related to a first classification from data related to a second classification; e.g., a plane or hyperplane that separates hypotheses generated by an Action LM (the first classification) from hypotheses generated by a Query LM (the second classification). A plane is a two-dimensional flat object that can separate a three-dimensional space into two two-dimensional sub-spaces. A hyperplane generalizes this concept, where an n−1 dimensional hyperplane (for n>3) is a flat n−1 dimensional object that can separate an n dimensional space into two n−1 dimensional sub-spaces.

For example, let $(x_1, y_1)$ be a point related to the first classification and let $(x_2, y_2)$ be a point related to the second classification, and further let $(x_1, y_1)$ and $(x_2, y_2)$ both be in $\mathbb{R}^2$. An example equation for a separating plane can be ax+by−c=0, where ax+by≥c, for (x, y) in the first classification; e.g., $ax_1+by_1 \geq c$, and where ax+by≤c for (x, y) in the second classification; e.g., $ax_2+by_2 \leq c$.

To solve a multi-class problem; e.g., where there are more than two classifications, the multi-class problem can be broken down into a series of binary classification problems, and a binary SVM can be generated to solve each binary classification problem in the series of binary classification problems. For example, suppose there are n classifications, C1, C2, C3 . . . Cn, and n binary functions including a binary function B1 that distinguishes classification C1 by outputting a non-zero value for inputs associated with classification C1 and outputting a zero value for inputs associated with the rest of the classification, a binary function B2 that distinguishes classification C2 by outputting a non-zero value for inputs associated with classification C2 and outputting a zero value for inputs associated with the rest of the classification, . . . and a binary function Bn that distinguishes that distinguishes classification Cn by outputting a non-zero value for inputs associated with classification Cn and outputting a zero value for inputs associated with the rest of the classes. By applying the n binary functions, a multi-class input can be divided into n different valued outputs, perhaps with n−1 outputs being zero. Classification of new instances can use a winner-takes-all strategy, in which the binary function with the highest output assigns the classification. In this strategy, the binary function can be formulated to produce comparable scores for all classes.

A logistic regression function or logistic function, for short, can take a number of predictor values as inputs; e.g., the list of n best hypotheses from each available language model or a lattice from each available language model. In embodiments where two language models are used, the logistic regression function can be a binary logistic regression function.

The logistic regression function then utilizes regression analysis to predict a value of a "categorical" variable; i.e., a variable that can be in one category of a limited number of categories, such as a variable indicating which language model best fits the input lattices or lists of n best hypotheses predictor values. As a conventions, one value of a binary categorical value; e.g., the Action LM is the language model to be used on a given input, is set to 1, while the other value; e.g., the Query LM is the language model to be used on a given input, is set to 0 and a probability P of the categorical variable whose value=1; e.g., the Action LM choice, is determined. Once P is determined, then Q, or the probability that the categorical variable has value=0, can be determined as 1−P.

The logistic regression function can two parameters, a and b, to model values of $$P: P = \frac{e^{a+bX}}{1+e^{a+bX}},$$

where a equals the value of P when X=0, where X represents the values in the input hypotheses, and b represents how quickly P changes per unit change of X. Along with predicting the value of the categorical value, the logistic regression function can determine a "logit" or natural log of the odds related to the categorical value. For example, the odds O of categorical variable having a probability $$P \text{ are } O = \frac{P}{1-P},$$

and the corresponding logit(P)=ln(O)=ln $$\left(\frac{P}{1-P}\right).$$

To show logit(P) equals the logistic regression function, note that logit(P)=a+bX, as ln $$\left(\frac{P}{1-P}\right) = a+bX, \text{ so } \frac{P}{1-P} = e^{a+bX} \rightarrow P = \frac{e^{a+bX}}{1+e^{a+bX}}.$$

Based on P (or the corresponding odds O), a probability that the input has the category associated with the 1 value (e.g., the Action LM is the language model to be used) can be determined, and based on that probability, the input can be classified as either in the 1-valued category (e.g., if P is above a 1-valued-category threshold, then the 1-valued category can be selected), or the 0-valued category (e.g., the Query LM is the language model to be used, if P is below a 0-valued-category threshold). Note that the 1-valued-category threshold can differ from the 0-valued-category threshold—values of P above the 0-valued-category threshold but below the 1-valued-category threshold can be "unclassified". In embodiments where the 0-valued-category threshold equals the 1-valued-category threshold, all inputs can be classified.

In embodiments where more than two language models are used, the logistic regression function can be a multinomial logistic regression function and the above approach adapted to handle more than two category values and corresponding odds/probabilities.

In some embodiments, such as shown in FIG. 3, classifier 340 can be a binary classifier configured to classify or select one selected language model as the most likely from a choice of two language models; e.g., the Query LM and the Action LM. In other embodiments, not shown in FIG. 3, classifier 340 can be an n-ary classifier configured to classify or select one selected language model as the most likely from a choice of n language models, where n>2; e.g., an SVM approach using a series of binary functions to reduce the n-ary classification problem to a number of binary classification problems, or a logistic regression function approach that uses a multinomial logistic regression function.

For example, suppose the input speech of block 310 is "Map of New York." An example lattice generated by a language model, such as Query LM 322, for this speech input is shown in Table 1 below:

TABLE 1

| MAP | (0.4) | OF (0.7) | NEW (0.7) | YOUR (0.6) |
| APP | (0.3) | HAVE (0.1) | KNEW (0.2) | YORK (0.3) |
| NAP | (0.2) | ... | ... | ... |
| NAB | (0.1) | ... | ... | ... |

The top row of the probability lattice shows the most likely words, with the probabilities shown in parenthesis. In this lattice, a language model has assigned a probability of 0.4 to the word "Map", the words "of" and "new" each have a respective 0.7 probability, and the word "your" has a probability of 0.6. The probabilities in the probability lattice are "posterior" probabilities, or probabilities determined based after taking relevant evidence—the speech input from block 310—into account.

A second lattice for the same input speech of "Map of New York" generated by another language model, such as Action LM 326, is shown in Table 2 below.

TABLE 2

| STOP (0.6) | OF (0.5) | NO (0.4) | YOUR (0.6) |
| SHOWMAP (0.3) | ONE (0.2) | NEW (0.2) | YARD (0.2) |
| OFF (0.2) | ... | ... | ... |
| OUT (0.1) | ... | ... | ... |

In this example, classifier 340 can take the lattices shown in Tables 1 and 2 as inputs. The classifier 340 can concentrate on material features of the input speech—for example, that the word "map" appears in the beginning of the utterance. Also, classifier 340 can treat lightly or disregard other features deemed immaterial; e.g., the classifier can determine that is it immaterial whether or not New York was properly recognized during first pass 320. For this example, classifier 340 can concentrate on the material features discussed above to select the lattice shown in Table 1 as more likely to represent the speech input and, in some embodiments, classifier 340 can correspondingly select a language model that generated the Table 1 lattice; e.g., Query LM 322, as a selected language model.

In other embodiments, the inputs to the classifier 340 can additionally or instead include the list of n best hypotheses from each available language model, and/or another representation of the probabilities (scores) assigned to the hypotheses by each available language model.

After classification and selection of a selected language model, second pass 350 of two-pass process 300 can be performed to refine and/or rescore the selected language model output. Second pass 350 can take one lattice, list of n best hypotheses, and/or representation of the probabilities that was/were generated by the selected language model. FIG. 3 shows that, if classifier 340 indicates "Use Query LM", lattice 344 can be provided as an input to second pass 350. When combined lattice 330 is used, lattice 344 can be combined lattice 330; else lattice 344 can be query lattice 324.

If classifier 340 indicates "Use Action LM", lattice 348 can be provided as an input to second pass 350. When combined lattice 330 is used, lattice 348 can be combined lattice 330; else lattice 348 can be action lattice 328.

Second pass 350 can involve running a selected language model, taking the input speech of block 310 and the input lattice (and/or other representation(s) output by the selected language model) as inputs. During second pass 350, only the selected language model is used to refine the hypotheses provided in the input lattice. Continuing the example mentioned above, as classifier 340 selected Query LM 322 as the selected language model, query lattice 324 is input, along with input speech from block 310, to second pass 350.

During second pass 350, language model+ 352 can process query or combined lattice 344 and the input speech from block 310. In some embodiments, language model+ 352 can involve executing Query LM 322 again with query or combined lattice 344 as an input, but otherwise under the same computational conditions (e.g., available processor time, available memory, and other available resources) as used during first pass 320. In other embodiments, language model+ 352 can involve executing Query LM 322 again taking can process query or combined lattice 344 as an input and with different or improved computational conditions (e.g., additional processor time, memory, and/or other resources) than available during first pass 320. In still other embodiments, language model+ 352 can involve utilizing additional and/or different language models than Query LM 322 to recognize search queries; e.g., more detailed language models, language models adapted to refine a set of initial inputs, such as can process query or combined lattice 344, and/or other language models configured to recognize search queries.

Similarly, language model+ 354 can involve can involve executing Action LM 326 again taking action or combined lattice 348 as an input, under the same, different, and/or improved computational conditions. In other embodiments, language model+ 354 can involve utilizing additional and/or different language models than Action LM 326 to recognize action commands; e.g., more detailed language models, additional inputs; e.g., additional inputs 332, language models adapted to refine a set of initial inputs, such as action or combined lattice 348, and/or other language models configured to recognize action commands.

FIG. 3 shows that recognition result 360, which is the output of second pass 350, is either refined query or combined lattice 362 if classifier 340 indicated use of the Query LM, or refined action or combined lattice 364 if classifier 340 indicated use of the Action LM. Two-step process 300 can then generate output(s) from recognition result 360; for example, text corresponding to the input speech of block 310, graphical/textual displays and/or spoken output(s) corresponding to the text, action commands, output(s) of the action commands, search queries, search results corresponding to the search queries, and/or other outputs.

When output(s) 370 include action command(s), the action command(s) can be provided to an action engine; e.g., the action engine of mobile device 204 described above that takes action commands as inputs and executes the action commands. When output(s) 370 include search queries, the search queries can be provided to a search engine; e.g., the search engine described above that takes search queries as inputs, performs searches using the input search queries, and returns search results corresponding to the search queries.

Example Data Network

Figure 4:
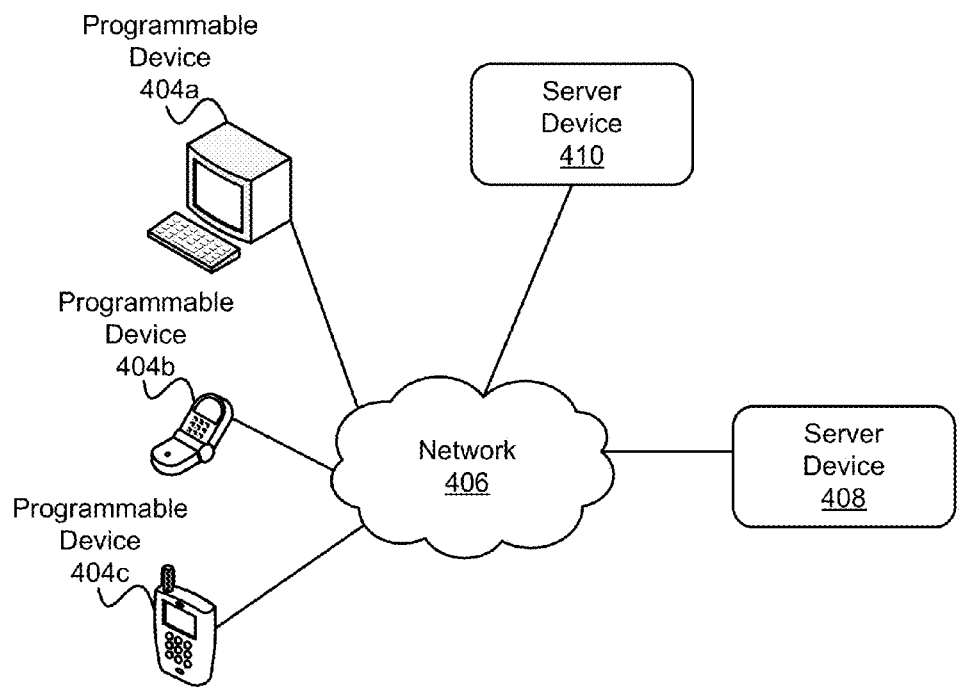
FIG. 4 depicts a distributed computing architecture, in accordance with an example embodiment.

FIG. 4 shows computing system 400 with server devices 408, 410 configured to communicate, via network 406, with programmable devices 404a, 404b, and 404c. In particular, computing system 400, server device 408, server device 410, programmable device 404a, programmable device 404b, and/or programmable device 404c can be configured to perform one or more functions or blocks of method 100, mobile device 204, voice interfaces 206, and/or process 300 described above at least in the context of FIGS. 1-3.

Network 406 may correspond to a LAN, a wide area network (WAN), a corporate intranet, the public Internet, or any other type of network configured to provide a communications path between networked computing devices. The network 406 may also correspond to a combination of one or more LANs, WANs, corporate intranets, and/or the public Internet.

Although FIG. 4 only shows three programmable devices, distributed application architectures may serve tens, hundreds, or thousands of programmable devices. Moreover, programmable devices 404a, 404b, and 404c (or any additional programmable devices) may be any sort of computing device, such as an ordinary laptop computer, desktop computer, network terminal, wireless communication device (e.g., a cell phone or smart phone), and so on. In some embodiments, programmable devices 404a, 404b, and 404c may be dedicated to the design and use of software applications. In other embodiments, programmable devices 404a, 404b, and 404c may be general purpose computers that are configured to perform a number of tasks and need not be dedicated to software development tools.

Server devices 408, 410 can be configured to perform one or more services, as requested by programmable devices 404a, 404b, and/or 404c. For example, server device 408 and/or 410 can provide content to programmable devices 404a-404c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 408 and/or 410 can provide programmable devices 404a-404c with access to software for database, search, computation, graphical, audio, video, World Wide Web/Internet utilization, and/or other functions. Many other examples of server devices are possible as well.

Computing Device Architecture

Figure 5A:
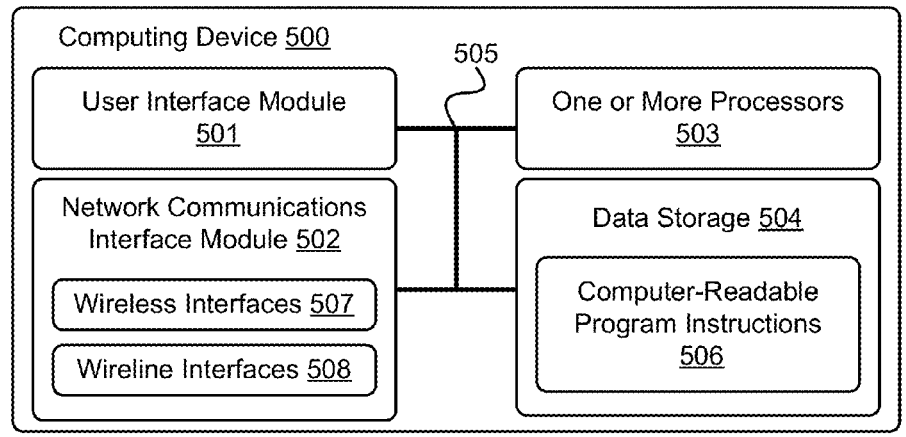
FIG. 5A is a block diagram of a computing device, in accordance with an example embodiment.

FIG. 5A is a block diagram of a computing device (e.g., system) in accordance with an example embodiment. In particular, computing device 500 shown in FIG. 5A can be configured to perform one or more functions or blocks of method 100, process 300, mobile device 204, voice interfaces 206, computing device 400, server devices 408, 410, network 406, and/or one or more of programmable devices 404a, 404b, and 404c, described above at least in the context of FIGS. 1 through 4. Computing device 500 may include a user interface module 501, a network-communication interface module 502, one or more processors 503, and data storage 504, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a computer mouse, a microphone, a track ball, a joystick, a camera, a voice recognition module, and/or other similar devices. User interface module 501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module

501 can also be configured with one or more sound output devices configured to generate audible output(s), such as a speaker, speaker jack, audio output port, audio output device, earphones, and/or other similar devices.

Network-communications interface module 502 can include one or more wireless interfaces 507 and/or one or more wireline interfaces 508 that are configurable to communicate via a network, such as network 406 shown in FIG. 4. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 503 can include one or more general purpose processors and/or one or more special purpose processors (e.g., digital signal processors, application specific integrated circuits, etc.). Processors 503 can be configured to execute computer-readable program instructions 506 that are contained in the data storage 504 and/or other instructions as described herein.

Data storage 504 can include one or more computer-readable storage media that can be read and/or accessed by at least one of processors 503. The one or more computer-readable storage media can include volatile and/or non-volatile storage components, such as optical, magnetic, organic or other memory or disc storage, which can be integrated in whole or in part with at least one of processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data, such as but not limited to data used by one or more processes and/or threads of a software application. In some embodiments, data storage 504 can additionally include storage required to perform at least part of the herein-described methods and techniques and/or at least part of the functionality of the herein-described devices and networks.

Cloud-Based Servers

Figure 5B:
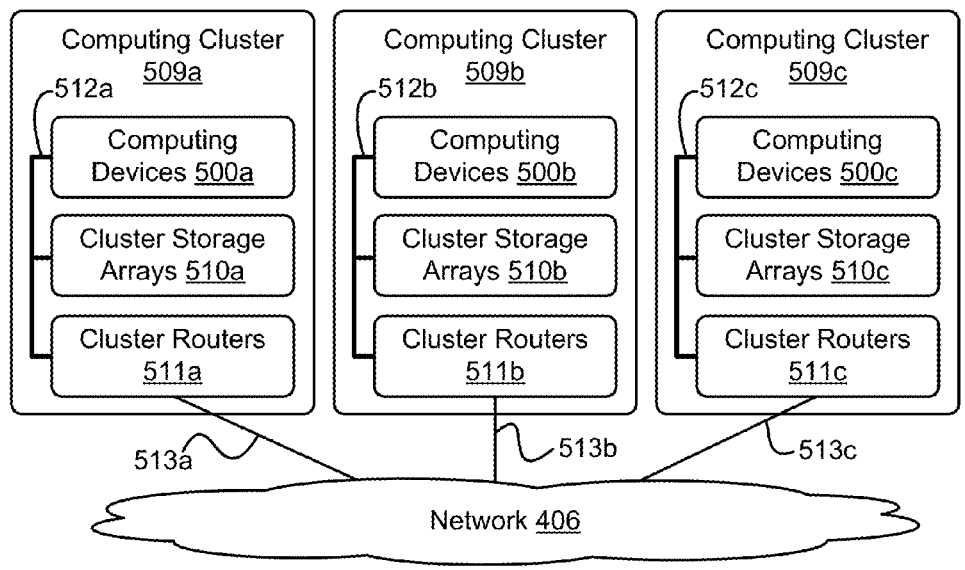
FIG. 5B depicts a cloud-based server system, in accordance with an example embodiment.

FIG. 5B depicts a network 406 of computing clusters 509a, 509b, 509c arranged as a cloud-based server system in accordance with an example embodiment. Server devices 408 and/or 410 can be cloud-based devices that store program logic and/or data of cloud-based applications and/or services. In some embodiments, computing system 400, server device 408 and/or server device 410 can be a single computing device residing in a single computing center. In other embodiments, computing system 400, server device 408 and/or server device 410 can include multiple computing devices in a single computing center, or even multiple computing devices located in multiple computing centers located in diverse geographic locations. For example, FIG. 4 depicts each of server devices 408 and 410 residing in different physical locations.

In some embodiments, data and services at computing system 400, server device 408 and/or server device 410 can be encoded as computer readable information stored in non-transitory, tangible computer readable media (or computer readable storage media) and accessible by programmable devices 404a, 404b, and/or 404c, and/or other computing devices. In some embodiments, data at computing system 400, server device 408 and/or server device 410 can be stored on a single disk drive or other tangible storage media, or can be implemented on multiple disk drives or other tangible storage media located at one or more diverse geographic locations.

FIG. 5B depicts a cloud-based server system in accordance with an example embodiment. In FIG. 5B, the functions of computing system 400, server device 408 and/or server device 410 can be distributed among three computing clusters 509a, 509b, and 509c. Computing cluster 509a can include one or more computing devices 500a, cluster storage arrays 510a, and cluster routers 511a connected by a local cluster network 512a. Similarly, computing cluster 509b can include one or more computing devices 500b, cluster storage arrays 510b, and cluster routers 511b connected by a local cluster network 512b. Likewise, computing cluster 509c can include one or more computing devices 500c, cluster storage arrays 510c, and cluster routers 511c connected by a local cluster network 512c.

In some embodiments, each of the computing clusters 509a, 509b, and 509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 509a, for example, computing devices 500a can be configured to perform various computing tasks of computing system 400, server device 408 and/or server device 410. In one embodiment, the various functionalities of computing system 400, server device 408 and/or server device 410 can be distributed among one or more of computing devices 500a, 500b, and 500c. Computing devices 500b and 500c in computing clusters 509b and 509c can be configured similarly to computing devices 500a in computing cluster 509a. On the other hand, in some embodiments, computing devices 500a, 500b, and 500c can be configured to perform different functions.

In some embodiments, computing tasks and stored data associated with computing system 400, server device 408 and/or server device 410 can be distributed across computing devices 500a, 500b, and 500c based at least in part on the processing requirements of computing system 400, server device 408 and/or server device 410, the processing capabilities of computing devices 500a, 500b, and 500c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 510a, 510b, and 510c of the computing clusters 509a, 509b, and 509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of computing system 400, server device 408 and/or server device 410 can be distributed across computing devices 500a, 500b, and 500c of computing clusters 509a, 509b, and 509c, various active portions and/or backup portions of these components can be distributed across cluster storage arrays 510a, 510b, and 510c. For example, some cluster storage arrays can be configured to store the data of server device 408, while other cluster storage arrays can store data of server device 410. Additionally, some cluster storage arrays can be configured to store backup versions of data stored in other cluster storage arrays.

The cluster routers 511a, 511b, and 511c in computing clusters 509a, 509b, and 509c can include networking equipment configured to provide internal and external communications for the computing clusters. For example, the cluster routers 511a in computing cluster 509a can include one or more internet switching and routing devices configured to provide (i) local area network communications between the computing devices 500a and the cluster storage arrays 510a via the local cluster network 512a, and (ii) wide area network communications between the computing cluster 509a and the computing clusters 509b and 509c via the wide area network connection 513a to network 406. Cluster routers 511b and 511c can include network equipment similar to the cluster routers 511a, and cluster routers 511b and 511c can perform similar networking functions for computing clusters 509b and 509b that cluster routers 511a perform for computing cluster 509a.

In some embodiments, the configuration of the cluster routers 511a, 511b, and 511c can be based at least in part on the data communication requirements of the computing devices and cluster storage arrays, the data communications capabilities of the network equipment in the cluster routers 511a, 511b, and 511c, the latency and throughput of local networks 512a, 512b, 512c, the latency, throughput, and cost of wide area network links 513a, 513b, and 513c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving input speech at a computing system;
   during a first pass of speech recognition, determining a plurality of outputs from a plurality of language models by:
   providing the input speech as an input to each of a plurality of language models, wherein the plurality of language models comprises a query language model and an action language model, and receiving an output from each language model;

determining a selected language model of the plurality of language models using a classifier operating on the plurality of outputs from the plurality of language models, wherein the classifier is configured to utilize a support vector machine (SVM) to select the selected language model, and wherein the SVM is configured to determine a plane or hyperplane related to the plurality of language-model outputs and to select the selected language model based on the plane or hyperplane;

during a second pass of speech recognition, determining a revised output by:

providing the input speech and the output from the selected language model as inputs to the selected language model, and receiving the revised output from the selected language model; and generating a result based on the revised output using the computing system.

2. The method of claim 1, wherein generating the result comprises:

generating text corresponding to the input speech based on the revised output; and generating spoken output corresponding to the input speech based on the text and/or the revised output.

3. The method of claim 1, wherein the query language model is configured to recognize search queries, wherein the action language model is configured to recognize action commands, and wherein the query language model differs from the action language model.

4. The method of claim 1, wherein the plurality of outputs comprises a query lattice output from the query language model and an action lattice output from the action language model.

5. The method of claim 1, wherein the classifier is further configured to receive the language-model outputs from both the action language model and the query language model and to select either the action language model or the query language model as the selected language model.

6. The method of claim 5, wherein determining the revised output comprises:

after selecting the action language model as the selected language model, providing the input speech and an action lattice to the action language model, and responsively receiving a revised action lattice from the action language model; and after selecting the query language model as the selected language model, providing the input speech and a query lattice to the query language model and responsively receiving a revised query lattice from the query language model.

7. The method of claim 1, wherein generating the result comprises:

after selecting the action language model as the selected language model:

generating an action request based on the revised output and generating the result by providing the action request to an action engine; and after selecting the query language model as the selected language model:

generating a query based on the revised output and generating the result by providing the action request to a query engine.

8. The method of claim 1, wherein the classifier is further configured to utilize a logistic regression function, and, wherein the logistic regression function is configured to model a probability that the plurality of outputs is related to the selected language model of the plurality of language models and to select the selected language model based on the modeled probability.

9. A computing system, comprising:

a processor; and a non-transitory computer-readable storage medium having stored thereon program instructions that, upon execution by the processor, cause the computing device to perform operations comprising:

receiving input speech, during a first pass of speech recognition, determining a plurality of outputs from a plurality of language models by:

providing the input speech as an input to each of a plurality of language models, wherein the plurality of language models comprises a query language model and an action language model, and receiving an output from each language model, determining a selected language model of the plurality of language models based on a classifier operating on the plurality of outputs from the plurality of language models, wherein the classifier is configured to utilize a support vector machine (SVM) to select the selected language model, and wherein the SVM is configured to determine a plane or hyperplane related to the plurality of language-model outputs and to select the selected language model based on the plane or hyperplane, during a second pass of speech recognition, determining a revised output by:

providing the input speech and the output from the selected language model as inputs to the selected language model, receiving a revised output from the selected language model, and generating a result based on the revised output.

10. The computing system of claim 9, wherein the operation of generating the result comprises:

generating text corresponding to the input speech based on the revised output; and generating spoken output corresponding to the input speech based on the text and/or the revised output.

11. The computing system of claim 9, wherein the query language model is configured to recognize search queries, wherein the action language model is configured to recognize action commands, and wherein the query language model differs from the action language model.

12. The computing system of claim 9, wherein the classifier comprises a binary classifier configured to receive the outputs from both the action language model and the query language model and to select either the action language model or the query language model as the selected language model.

13. The computing system of claim 12, wherein the operation of determining the revised output comprises:

after selecting the action language model as the selected language model, providing the input speech and an action lattice to the action language model, and responsively receiving a revised action lattice from the action language model; and after selecting the query language model as the selected language model,
> providing the input speech and a query lattice to the query language model, and
> responsively receiving a revised query lattice from the query language model.

14. The computing system of claim 9, wherein the operation of generating the result comprises:
after selecting the action language model as the selected language model:
> generating an action request based on the revised output, and
> generating the result by providing the action request to an action engine; and after selecting the query language model as the selected language model:
> generating a query based on the revised output, and
> generating the result by providing the action request to a query engine.

15. A non-transitory computer-readable storage medium having stored thereon program instructions that, upon execution by a computing system, cause the computing system to perform operations comprising:
receiving input speech;
during a first pass of speech recognition, determining a plurality of outputs from a plurality of language models by:
> providing the input speech as an input to each of a plurality of language models, wherein the plurality of language models comprises a query language model and an action language model, and
> receiving an output from each language model;

determining a selected language model of the plurality of language models based on a classifier operating on the plurality of outputs from the plurality of language models, wherein the classifier is configured to utilize a support vector machine (SVM) to select the selected language model, and wherein the SVM is configured to determine a plane or hyperplane related to the plurality of language-model outputs and to select the selected language model based on the plane or hyperplane;

during a second pass of speech recognition, determining a revised output by:
> providing the input speech and the output from the selected language model as inputs to the selected language model, and
> receiving a revised output from the selected language model; and generating a result based on the revised output.

16. The non-transitory computer-readable storage medium of claim 15, wherein the operation of generating the result comprises:
> generating text corresponding to the input speech based on the revised output; and
> generating spoken output corresponding to the input speech based on the text and/or the revised output.

17. The non-transitory computer-readable storage medium of claim 15, wherein the query language model is configured to recognize search queries, wherein the action language model is configured to recognize action commands, and wherein the query language model differs from the action language model.

18. The non-transitory computer-readable storage medium of claim 15, wherein the classifier is further configured to receive the outputs from both the action language model and the query language model and to select either the action language model or the query language model as the selected language model.

19. The non-transitory computer-readable storage medium of claim 18, wherein the operation of determining the revised output comprises:
after selecting the action language model as the selected language model,
> providing the input speech and an action lattice to the action language model, and
> responsively receiving a revised action lattice from the action language model; and after selecting the query language model as the selected language model,
> providing the input speech and a query lattice to the query language model, and
> responsively receiving a revised query lattice from the query language model.

20. The non-transitory computer-readable storage medium of claim 15, wherein the operation of generating the result comprises:
after selecting the action language model as the selected language model:
> generating an action request based on the revised output, and
> generating the result by providing the action request to an action engine; and after selecting the query language model as the selected language model:
> generating a query based on the revised output, and
> generating the result by providing the action request to a query engine.

* * * * *